May 24, 1960
W. McCOSKEY
2,937,575
MILLING CUTTER
Filed Oct. 15, 1956
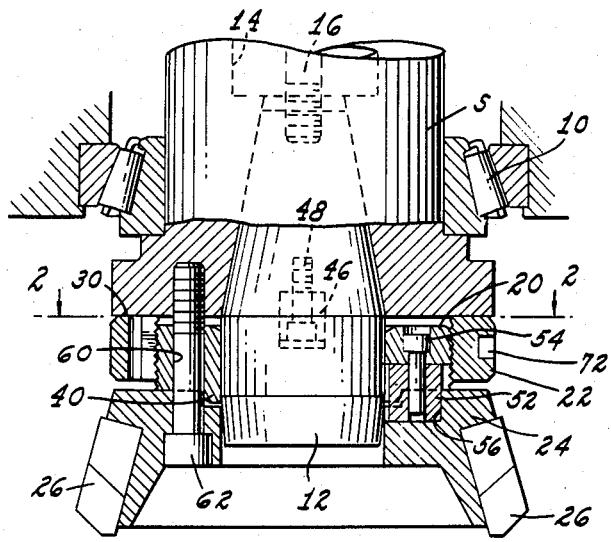
FIG. 1
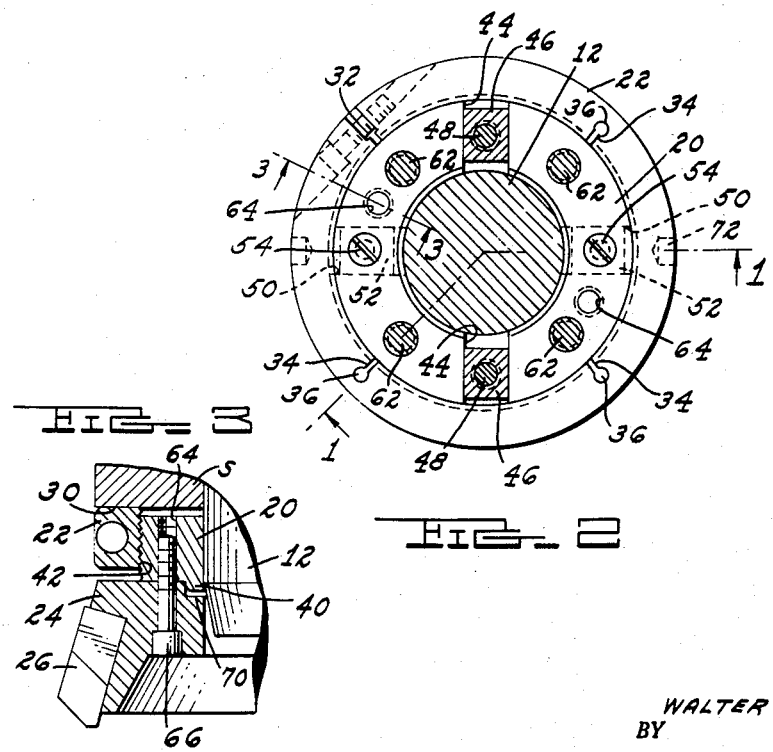
FIG. 2
FIG. 3
INVENTOR.
WALTER McCOSKEY
BY
Barnes, Kisselle, Laughlin & Raisch
ATTORNEYS

United States Patent Office 2,937,575
Patented May 24, 1960

2,937,575

MILLING CUTTER

Walter McCoskey, Detroit, Mich., assignor to Snyder Tool & Engineering Co., Detroit, Mich., a corporation of Michigan Filed Oct. 15, 1956, Ser. No. 615,828

4 Claims. (Cl. 90—11)

This invention relates to a milling cutter and more particularly to a milling cutter with insertable blades which can be ground and the assembly adjusted prior to re-assembly on the spindle of a machine.

Devices which have utilized pre-set spindle assemblies have been quite heavy in construction, and it is an object of the present device to provide a simpler adjustable unit which is light enough in inherent structure that it can be easily handled by a machine operator for assembly and disassembly.

Another object is the provision of a dimension-retaining multi-part assembly which is inherently stable in operation respecting concentricity and axial length.

Other objects and features of the invention will be apparent in the following description and claims.

Drawings accompany the disclosure, and the various views thereof may be briefly described as:

Figure 1, a section on line 1—1 of Figure 2 through an assembled device showing the relationship to a spindle.

Figure 2, a sectional view on line 2—2 of Figure 1.

Figure 3, a partial section on line 3—3 of Figure 2.

Referring to the drawings, a spindle S is mounted on bearings 10 in a machine tool. A stud 12 is inserted in a center bore 14 provided with a non-locking taper and held in place by a draw bar rod 16.

The milling cutter consists of a mounting ring 20, an adjustment ring 22, and a blade head 24. The blade head of the cutter assembly has assembled therein blades 26, which are mounted for adjustment in the head to permit grinding to compensate for wear. Such constructions are shown in the United States Stuber Patent No. 2,423,-419 and the United States Miller Patent No. 1,951,101, issued March 13, 1934.

The spindle S has a flat radial surface 30 which serves as a reference surface for the tool. In contact with this surface is a rear side of adjustment ring 22 which is a split ring held together at the split by a bolt 32 (Figure 2) so that the ring may be tightened on the mounting ring 20. There is a threaded engagement between ring 22 and mounting 20, and it is preferable that these threads be very accurately formed to insure proper operation of the assembly. An Acme thread on both parts has been found to be satisfactory.

Ring 22 is also provided with slots 34 on its inner surface circumferentially spaced to permit and obtain an even distribution of the contraction of the ring as it is tightened on the mounting ring 20. The slots 34 terminate in an axial hole 36. The mounting ring 20 is a solid ring having a short boss 40 concentric with the threaded surface 42. The ring and the boss are straight bored to receive the cylindrical portion of the spindle stud 12. The adapter ring is provided with two key slots 44 diametrically opposed to receive key blocks 46 recessed into the spindle surface 30 and held in place by bolts 48 (see Figure 1).

The front face of ring 20 is recessed diametrically at 90° opposed to the first recesses of the slots 50 to receive key blocks 52 held in place by bolts 54. These key blocks 52 recess into openings 56 in the rear surface of the blade head 24.

Thus, the blade head, the mounting ring 20 and the spindle S are locked together for mutual rotation. The mounting ring 20 is also provided with four equally spaced holes 60 to receive bolts 62 which transfix the cutter head and the ring and anchor in threaded holes in the spindle.

Also spaced around the ring 20 are two tapped holes 64 which receive bolts 66 which pass through the blade head 24 and serve to hold the blade head on the mounting ring. On large cutters, four of these bolts 66 can be used. Only two are shown in the drawings.

The cutter head 24 has a central bore to receive the end of spindle stud 12, and this head is recessed at 70 on the inner surface around this bore to receive the boss 40 of the mounting ring 20. The parts are thus concentrically positioned by this relationship.

The parts are shown in mounted relation on the spindle in the drawings. To dismount the assembly, the bolts 62 are released, and the assembly consisting of parts 20, 22 and 24 is readily removed from the spindle stud 12. If it is desired to re-set the blades and re-grind the assembly, the dimension between the radial surface of the spindle S and the cutting edges of the blades can be readily maintained by adjusting the ring 22 subsequent to the grinding. This adjustment is obtained by releasing screw 32 slightly and utilizing holes 72 in the outer surface of the ring for shifting the ring to a position to reach the original desired dimension between the rear surface 30 of the ring and the cutting edges of the blades 26. The screw 32 is then re-tightened, and the assembly can be conveniently mounted on the spindle in its identical original position.

It will thus be seen that there is provided an assembly which is reduced in weight to an absolute minimum and which can thus be readily handled by the machine operator for removal and installation. In addition, the parts are related to insure an accurate assembly still subject to proper adjustment during the tool-room operation.

I claim:

1. A milling cutter assembly for post-grinding dimension-control compensatory to cutter wear which comprises, a spindle for a milling machine having a center bore and a radial face normal to the rotating axis of the spindle, a spindle shaft in said bore, having a cylindrical portion projecting beyond said face, a mounting ring on, and concentric with, said shaft, a positioning ring on said mounting ring readily movable to control axial dimension of said assembly and positionable to project axially to the spindle side thereof to contact said face circumferentially of said spindle, a cutter blade head on said mounting ring projecting axially away from the spindle side having a plurality of axially adjustable cutting members adjacent an outer face, means to position said head concentrically with said mounting ring, readily releasable circumferentially spaced locking means anchored in said spindle and transfixing said mounting ring and head adapted to be tightened to exert an axial force to draw said rings and said cutter head together and said positioning ring tightly against said spindle face, and means independent of said last means and dependent of each other to transmit torque respectively from the spindle to the mounting ring and the mounting ring to the cutter head, said positioning ring being locked in place against adjustment movement when said locking means are tightened and being movable to a new position when said locking means is released.

2. A milling cutter assembly to transfer torque from a machine spindle having a radial spindle face to cutting blades adapted to post-grinding dimension-control compensatory to cutter wear which comprises, a mounting ring having a cylindrical inner opening for attachment to a machine spindle, an adjustment ring concentrically and axially shiftable on said mounting ring to lie co-axial with and in radial face contact with a spindle and adapted to be associated with a spindle independent of torque transfer, a first releasable means acting on said adjustment ring to lock said adjustment ring in predetermined positions axially relative to said mounting ring, a milling cutter blade head for receiving blade inserts which are axially adjustable relative to said head, means to transmit torque from said spindle to said mounting ring and then to said head, and a second releasable means independent of said first releasable means and of said last means to draw said mounting ring and said head securely against said spindle face and to lock said adjustment ring against adjustment movement, said adjustment ring being shiftable axially relative to said mounting ring upon loosening of both said releasable means.

3. A milling cutter assembly for mounting against a radial spindle face adapted to permit post-grinding dimension-control compensatory to cutter wear which comprises, a mounting ring having an inner face and an outer face to be positioned at varying distances from said radial spindle face, a blade head for adjustable cutting blade inserts mounted on one side of said ring having an inner face contacting the outer face of said ring, means positively to position said ring and said head for radial concentricity, means positively to position said head and said ring axially in a reproducible relation, means on the inner face of said ring to transmit driving torque from a spindle to said ring, means associating the contacting faces of said ring and head to transmit driving torque to the head, means on said ring, independent of said torque transmitting means, axially and selectively shiftable to control the axial distance between said ring and the said spindle face and maintaining concentricity with said ring regardless of position, and releasable fastening means independent of said last means and said torque transmitting means transfixing said head and ring and adapted to be anchored in a spindle to maintain axial relation of said assembly to a spindle when mounted thereon, said axially and selectively shiftable means being locked in position by said fastening means and being shiftable to predetermined adjustment upon release of said fastening means.

4. A milling cutter assembly to transfer torque from a machine spindle to cutting blades adapted to post-grinding dimension-control compensatory to cutter wear which comprises a spindle having a central stub arbor projecting therefrom, said spindle having a radial face extending from the base of said arbor, a composite cutter and mounting ring axially shiftable on said stub arbor and mounted concentrically on said arbor, the forward portion of said cutter having a plurality of adjustable cutting members mounted thereon adapted to be adjusted and ground to compensate for wear and the rearward portion of said composite cutter having a threaded cylindrical extension, a locater ring threaded on said extension adapted to extend to the rear of said extension in flat contact with the radial face of said spindle, means interlocking said spindle and the rearward extension of said composite cutter in various positions of axial adjustment to transmit torque from said spindle to said cutter, and releasable means independent of said last means to draw said composite cutter and mounting ring securely toward said spindle face to lock said locater ring in tight contact with said radial face of said spindle, said locater ring being shiftable axially relative to said mounting ring upon loosening of said releasable means to compensate for cutter wear and grinding.

References Cited in the file of this patent

UNITED STATES PATENTS

| 831,272 | Fletcher | Sept. 18, 1906 |
| 1,839,569 | Lovejoy | Jan. 5, 1932 |
| 2,309,016 | Ryan | Jan. 19, 1943 |
| 2,351,491 | Connell | June 13, 1944 |
| 2,371,089 | Weddell | Mar. 6, 1945 |

FOREIGN PATENTS

| 577,884 | Great Britain | June 4, 1946 |
| 1,039,212 | France | May 13, 1953 |